United States Patent [19]

Goto et al.

[11] Patent Number: 4,679,465
[45] Date of Patent: Jul. 14, 1987

[54] ECCENTRIC SWING GEAR TRANSMISSION

[76] Inventors: Yasuo Goto, 10-7,Minami-Ohi 4-chome, Shinagawa-ku, Tokyo; Masao Adachi, 1598-68,Nogaya-cho, Machida-City, Tokyo, both of Japan

[21] Appl. No.: 777,427

[22] Filed: Sep. 18, 1985

[30] Foreign Application Priority Data

Sep. 20, 1984 [JP] Japan ............................. 59-197256

[51] Int. Cl.⁴ ............................................. F16H 1/28
[52] U.S. Cl. ..................................... 74/805; 74/804
[58] Field of Search ......................... 74/803, 804, 805

[56] References Cited

U.S. PATENT DOCUMENTS

| | | | |
|---|---|---|---|
| 158,035 | 12/1874 | Cliff | 74/803 |
| 1,192,627 | 7/1916 | Hatlee | 74/803 |
| 2,250,259 | 7/1941 | Foote | 74/805 |
| 3,955,445 | 5/1976 | Osterwalder | 74/805 |
| 4,452,102 | 6/1984 | Shaffer | 74/804 |

FOREIGN PATENT DOCUMENTS 447444  5/1936  United Kingdom ................. 74/805

Primary Examiner—Allan D. Herrmann
Attorney, Agent, or Firm—McGlew and Tuttle

[57] ABSTRACT

A transmission which comprises eccentric swing gears composed of a speed change internal gear and a speed change external gear each having a pressure angle of a tooth form within 30° to 45° and an addendum h satisfying the relation of $m/2 > h > 0$ ($m$ = module), the speed change external gear engaging with the speed change internal gear therein, and coupling gears composed of a coupling internal gear having a trapezoidal or a substantially trapezoidal tooth form and a coupling external gear similarly having a trapezoidal or a substantially trapezoidal tooth form and having the same number of teeth as the coupling internal gear, the coupling external gear engaging with the coupling internal gear therein, the tooth forms of the coupling internal and external gears being molded so that the following relation may be satisfied between $\theta_1$ and $\theta_2$:

$$\theta_2 = (360°/Z \times \tfrac{1}{2}) + \theta_1$$

wherein $Z$ represents the teeth number of the coupling internal gear and the coupling external gear, and $\theta_1$ and $\theta_2$ represent pressure angles of the coupling external gear and the coupling internal gear, respectively, the eccentric swing gears being connected to the coupling gears.

2 Claims, 8 Drawing Figures

ECCENTRIC SWING GEAR TRANSMISSION

The present invention relates to a transmission in which gears are employed.

The inventors of the present application have developed a final reduction gear having a high reduction ratio and a high efficiency which is provided with a planet gear reduction mechanism comprising an eccentric swing gear for reducibly rotating in a direction opposite to a rotational direction of an input shaft while engaging with a stationary internal gear in compliance with a rotational motion of a balance weight fixedly inserted into the input shaft. In this final reduction gear, a coupling gear connected to the eccentric swing gear is disposed axially or radially to the input shaft so as to engage with an internal or external coupling gear, whereby a reduced rotation of the eccentric swing gear is transmitted to an output shaft. Further, if desired, the above-mentioned mechanism can be combined in a plural-stage constitution in order to easily obtain a desired high reduction ratio {Japanese Utility Model Application No. 76822/1973 (Japanese Utility Model Publication No. 44869/1976)}.

However, with regard to the aforesaid planet gear reduction mechanism, i.e., the eccentric swing gears composed of the stationary internal gear (hereinafter referred to as the speed change internal gear) and the eccentric swing gear (hereinafter referred to as the speed change external gear), the improvement of its reduction ratio has been desired. This reason is that generally, in the eccentric swing gears, the smaller a difference between the teeth numbers of the speed change internal gear and the speed change external gear becomes, the higher the reduction ratio becomes, but in the above-mentioned conventional gears, the difference therebetween is limited to four or so for the sake of preventing the interference of the teeth. Since one stage of the eccentric swing gears cannot provide the high reduction ratio, they are required to be constructed in the multi-stage structure.

Further, the above-mentioned coupling gear is constituted so as to possess external teeth (internal teeth) having the same teeth number as the internal teeth (external teeth) of the partner internal or external coupling gear, and the tooth forms of both the teeth are different in pitch. In short, these gears, for example, take the constitution of trochoid gears or the like. In consequence, the difference between the teeth numbers is set to zero, in other words, a so-called zero teeth difference is established, whereby a reduced rotation of the above-mentioned eccentric swing gear is transmitted to the aforesaid coupling gears directly and loyally.

However, in the case of the engaging state of the so-called zero teeth difference as just described, a slip ratio is extremely large in contrast to the case of the general gears. Accordingly, conventional means such as the aforesaid trochoid gears or the like has the drawback that friction is noticeable owing to the mutual linear contact of teeth faces.

In view of the aforementioned circumstances, the present invention has now been achieved, and its object is to provide a transmission which comprises eccentric swing gears composed of a speed change internal gear and a speed change external gear each having a pressure angle of a tooth form within 30° to 45° and an addendum h satisfying the relation of m/2>h>0 (m=module), the speed change external gear engaging with the speed change internal gear therein, and coupling gears composed of a coupling internal gear having a trapezoidal or a substantially trapezoidal tooth form and a coupling external gear similarly having a trapezoidal or a substantially trapezoidal tooth form and having the same number of teeth as the coupling internal gear, the coupling external gear engaging with the coupling internal gear therein, the tooth forms of the coupling internal and external gears being molded so that the following relation may be satisfied between $\theta_1$ and $\theta_2$:

$$\theta_2 = (360°/Z \times \tfrac{1}{2}) + \theta_1$$

wherein Z represents the teeth number of the coupling internal gear and the coupling external gear, and $\theta_1$ and $\theta_2$ represent pressure angles of the coupling external gear and the coupling internal gear, respectively.

The above-mentioned object and other objects as well as characteristics of the present invention will be definite from the description in reference to accompanying drawings, in which:

FIGS. 1(a) and 1(b) are skeleton diagrams illustrating embodiments of a transmission regarding the present invention;

Figure 1A:
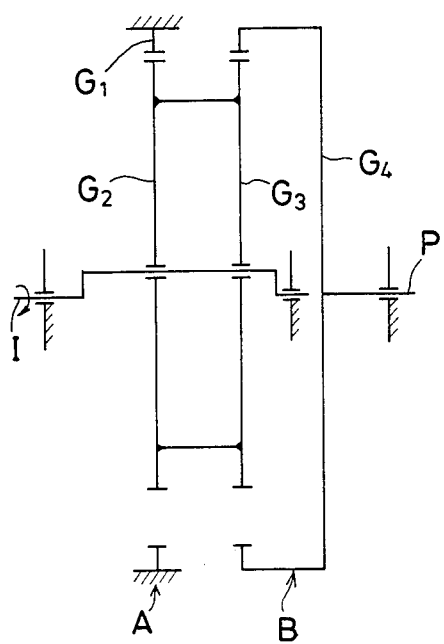

FIG. 1(a) conceptionally shows a motion mechanism of a transmission regarding the present invention, and a symbol A indicates a section of eccentric swing gears and a symbol B represents a section of coupling gears. Further in this drawing, symbols G1, G2, G3 and G4 represent a speed change internal gear, a speed change external gear, a coupling external gear and a coupling internal gear, respectively. Furthermore, symbols I and P are an input shaft and an output shaft, respectively.

Figure 2A:
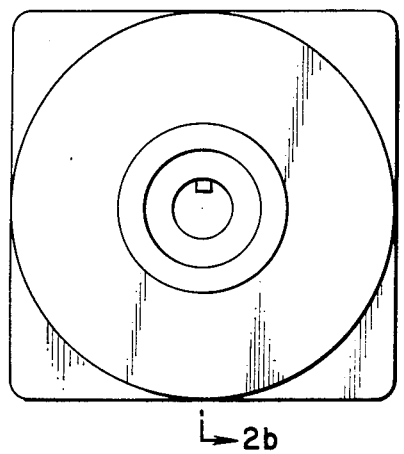
FIG. 2(a) is a front view of an embodiment of the transmission regarding the present invention.
Figure 2B:
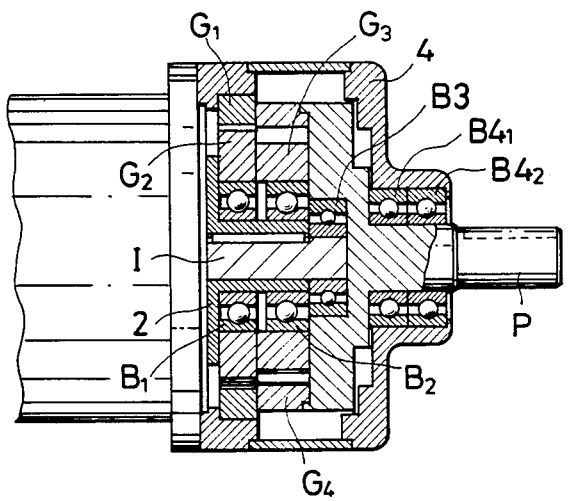
FIG. 2(b) is a sectional view taken along the line 2b—2b in FIG. 2(a)

FIGS. 2(a) and 2(b) exhibit an embodiment of the transmission equipped with such a motion mechanism as is shown in FIG. 1(a). As shown in FIG. 2(b), the speed change external gear G2 is provided integrally with the coupling external gear G3, and they are loosely inserted into an eccentric sleeve 2 with the interposition of bearings B1, B2, the input shaft I being inserted into the eccentric sleeve 2. B3 represents bearings for supporting one end portion of the input shaft I, B4$_1$ and B4$_2$ are bearings for supporting the output shaft P, and reference numeral 4 is a casing.

Figure 3:
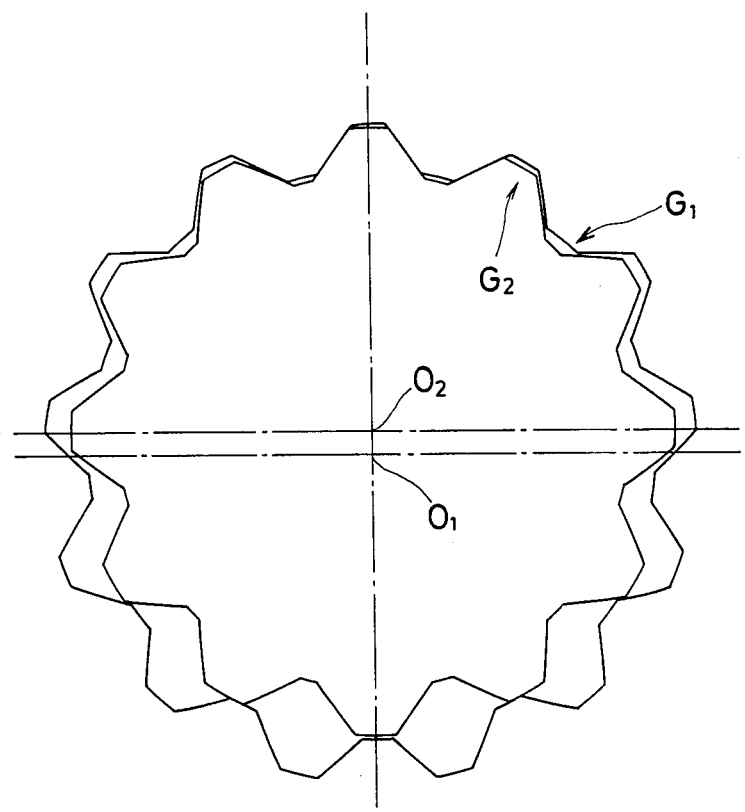
FIG. 3 is a conceptional view explaining an engaging state of eccentric swing gears regarding the present invention.

FIG. 3 conceptionally shows an engaging state of the speed change internal gear G1 and the speed change external gear G2 used in the eccentric swing gears regarding the present invention, and the speed change external gear G2 which is smaller in the number of teeth by one than the speed change internal gear G1 engages with the latter gear G1 therein. In this drawing, 0$_1$ and 0$_2$ represent axial centers of the speed change internal gear and the speed change external gear, respectively.

Each of the speed change internal gear G1 and the speed change external gear G2 is molded into an involute tooth form. A pressure angle of these gears is set at a level of 30° to 45°, and in the case of the embodiment shown in FIG. 3, the pressure angle is 36°.

An addendum h of the speed change internal gear G1 and the speed change external gear G2 is in the relation of $m/2 > h > 0$ wherein m represents a module. In the embodiment in FIG. 3, the addendum h is 0.45 m (m = module).

In the eccentric swing gears having the gears constituted as in FIG. 3, a difference between the teeth numbers of the speed change internal gear G1 and the speed change external gear G2 can be set to one but can also be set to a level of 1 to 4 or more.

Figure 4:
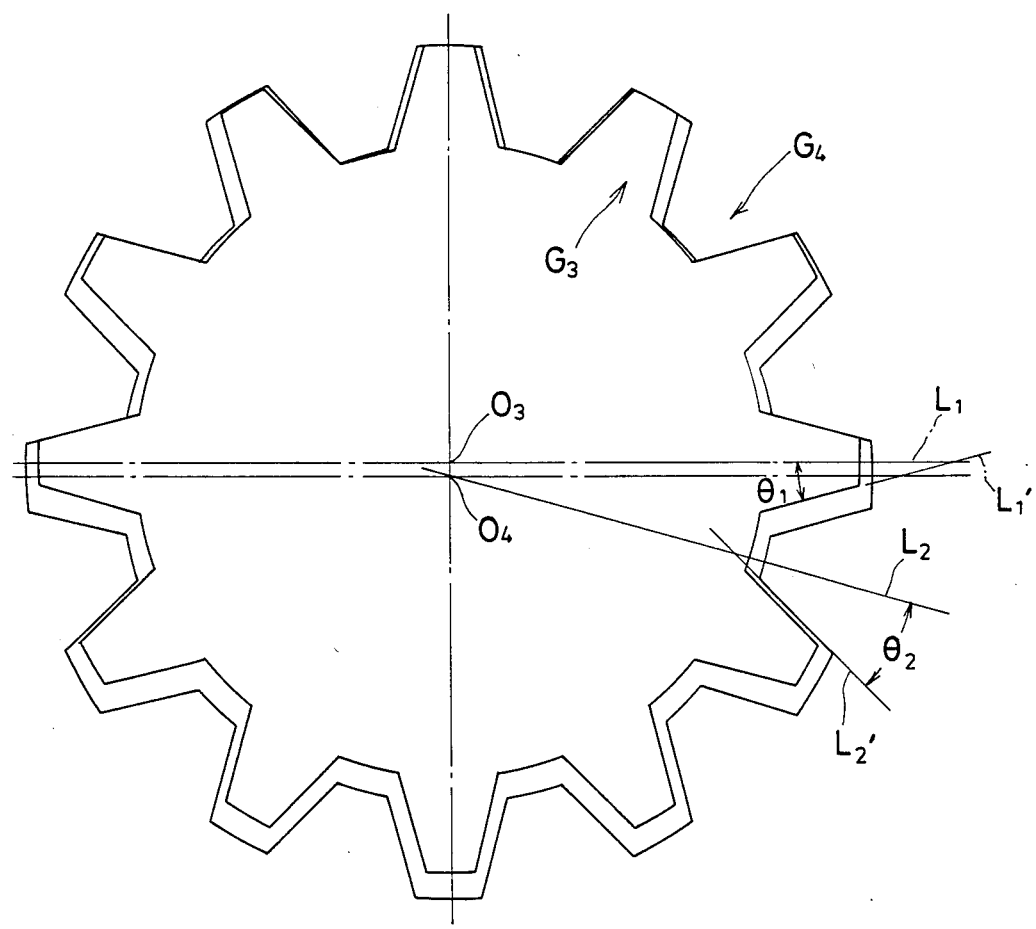
FIG. 4 is a conceptional view explaining an engaging state of coupling gears regarding the present invention.

FIG. 4 conceptionally shows an engaging state of the coupling external gear G3 and the coupling internal gear G4 used in the coupling gears regarding the present invention. As shown in this drawing, the coupling external gear G3 engages with the coupling internal gear G4 therein having the same teeth number as the coupling external gear G3. In FIG. 4, $0_3$ and $0_4$ represent axial centers of the coupling external gear G3 and the coupling internal gear G4, respectively.

Tooth forms of the coupling internal gear G3 and the coupling external gear G4 are molded so that the following relation may be satisfied between $\theta_1$ and $\theta_2$:

$$\theta_2 = (360°/Z \times \tfrac{1}{2}) + \theta_1$$

wherein Z represents the teeth number of the coupling internal gear G4 and the coupling external gear G3, and $\theta_1$ and $\theta_2$ represent pressure angles of the coupling external gear and the coupling internal gear, respectively, as shown in FIG. 4.

The coupling external gear G3 and the coupling internal gear G4 of the present invention are trapezoidal or substantially trapezoidal. The above-mentioned pressure angles $\theta_1$, $\theta_2$ are made between central lines $L_1$, $L_2$ of the respective teeth forms and extension lines $L_1'$, $L_2'$ of the respective tooth forms.

Figure 5:
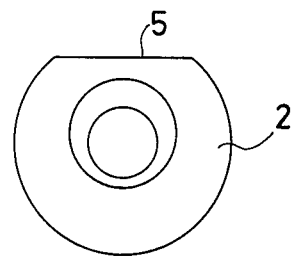
FIG. 5 is a front view of an eccentric sleeve used in the present invention.

FIG. 5 shows a configuration of the eccentric sleeve 2, which is provided, on its brim, with a cutout portion 5 for preventing vibration which will be caused by the deviation of a weight. This cutout portion 5 may be formed into a circular opening.

Figure 1B:
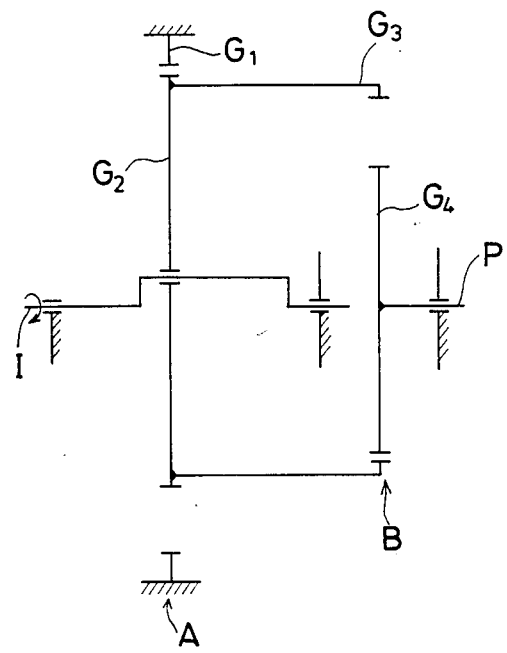

Further, the embodiment of the present invention shown in FIG. 1 is directed to the final reduction gears, but the input shaft I may be exchanged for the output shaft P in order to apply the present invention to speed up gears.

Figure 6:
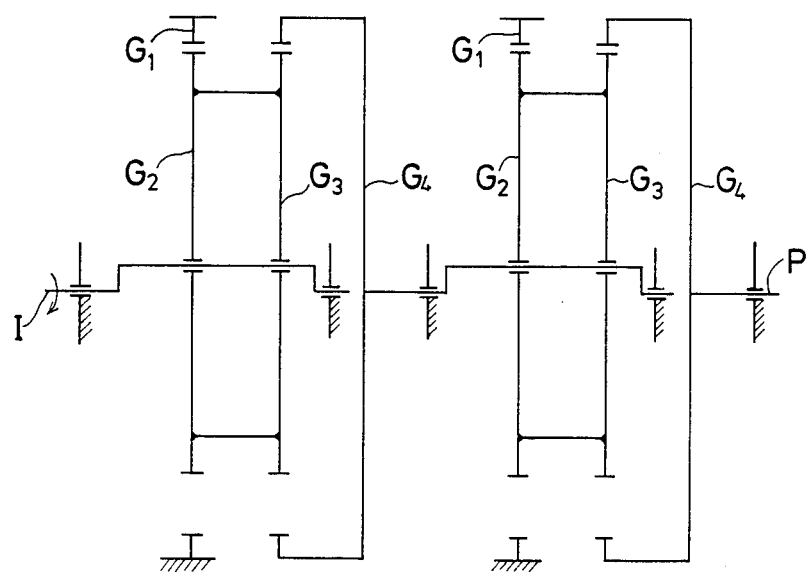
FIG. 6 is a skeleton diagram illustrating an embodiment of the multi-stage transmission regarding the present invention.

Furthermore, the transmission of the present invention can take such a multi-stage constitution as is shown in FIG. 6.

With regard to the gears G1, G2, G3 and G4, the disposition relation of the internal and the external teeth may be inverted. For example, the gear G3 may be disposed as the internal gear and the gear G4 may be arranged as the external gear, as exhibited in FIG. 1(b).

The integral formation of the above-mentioned external gears G2 and G3 can be accomplished in a manner such as pin fastening, laser welding, frictional compressive joining, electron beam welding, brazing or another usual welding.

A rotational frequency $N_2$ of the output shaft P to a rotational frequency $N_1$ of the input shaft I can be given by the following formula:

$$N_2 = -\{(Z_1 - Z_2)/Z_2\} \times N_1$$

wherein $Z_1$ and $Z_2$ represent the teeth numbers of the speed change internal gear G1 and the speed change external gear G2, respectively.

In short, they constitute so-called planet reduction gears.

The present invention permits decreasing a value of $Z_1 - Z_2$ up to one, and thus an extremely high reduction ratio can be obtained.

In the coupling gears having the constitution shown in FIG. 4, the coupling external gear G3 has the same teeth number as the coupling internal gear G4, and the external teeth engage with the internal teeth. The tooth forms of the internal and external teeth are different in pitch, but a difference between the numbers of these teeth is zero, in other words, they have the engaging state of a so-called zero tooth difference, as in the case of, for example, conventional trochoid gears. Accordingly, the reduced rotation of the above-mentioned speed change external gear G2 shown in FIG. 3 can be transmitted directly and reliably.

In the thus constituted coupling gears, since their tooth faces having the different pressure angles are brought into contact with each other, there is less friction therebetween.

According to the present invention, the speed change internal gear and the speed change external gear having the specific tooth forms engages with each other, and the difference between the teeth numbers of these gears can be reduced up to one without any interference. Therefore, an extremely high reduction ratio can be obtained, and even in the case of the one-stage transmission, a sufficient speed reduction can be accomplished, which fact permits compacting the transmission itself.

Further, in the present invention, the coupling external gear and the coupling internal gear having the specific tooth forms engage with each other, and their tooth faces having different pressure angles are brought into contact with each other. Therefore, the friction therebetween is small, which effect is great in practical usage.

Furthermore, the eccentric swing gears can be connected to the coupling gears by integrally constituting the speed change external gear and the coupling external gear, or by another manner. Thus, it can be intended to compact the transmission and lighten its weight.

What is claimed is:

1. A transmission which comprises eccentric swing gears composed of a speed change internal gear and a speed change external gear each having a pressure angle of a tooth form within 30° to 45° and an addendum h satisfying the relation of $m/2 > h > 0$ (m = module), said speed change external gear engaging with the speed change internal gear therein, and coupling gears composed of a coupling internal gear having a trapezoidal or a substantially trapezoidal tooth form and a coupling external gear similarly having a trapezoidal or a substantially trapezoidal tooth form and having the same number of teeth as said coupling internal gear, the coupling external gear engaging with the coupling internal gear therein, the tooth forms of said coupling internal and external gears being molded so that the following relation may be satisfied between $\theta_1$ and $\theta_2$:

$$\theta_2 = (360°/Z \times \tfrac{1}{2}) + \theta_1$$

wherein Z represents the teeth number of said coupling internal gear and said coupling external gear, and $\theta_1$ and $\theta_2$ represent pressure angles of said coupling external gear and said coupling internal gear, respectively, said eccentric swing gears being connected to said coupling gears.

2. A transmission according to claim 1 wherein said speed change external gear of said eccentric swing gears is molded integrally with at least one of said coupling external gear and said coupling internal gear of said coupling gears.

* * * * *